United States Patent
Nadav et al.

(10) Patent No.: US 10,747,821 B2
(45) Date of Patent: Aug. 18, 2020

(54) OPTIMIZED DIGITAL COMPONENT ANALYSIS SYSTEM

(71) Applicant: Google LLC, Mountain View, CA (US)

(72) Inventors: Uri Nadav, Menlo Park, CA (US); Patrick Hummel, Cupertino, CA (US)

(73) Assignee: Google LLC, Mountain View, CA (US)

(*) Notice: Subject to any disclaimer, the term of this patent is extended or adjusted under 35 U.S.C. 154(b) by 195 days.

(21) Appl. No.: 15/729,862

(22) Filed: Oct. 11, 2017

(65) Prior Publication Data
US 2018/0101526 A1 Apr. 12, 2018

Related U.S. Application Data

(60) Provisional application No. 62/406,660, filed on Oct. 11, 2016.

(51) Int. Cl.
| | |
|---|---|
| G06F 7/02 | (2006.01) |
| G06F 16/00 | (2019.01) |
| G06F 16/93 | (2019.01) |
| G06F 16/2457 | (2019.01) |
| G06F 40/10 | (2020.01) |
| G06F 3/0481 | (2013.01) |

(52) U.S. Cl.
CPC ............ *G06F 16/93* (2019.01); *G06F 3/0481* (2013.01); *G06F 16/24578* (2019.01); *G06F 40/10* (2020.01)

(58) Field of Classification Search
CPC ........... G06F 16/24578; G06F 30/0275; G06F 16/93; G06F 17/21; G06F 17/24; G06F 16/958; G06F 17/212
See application file for complete search history.

(56) References Cited

U.S. PATENT DOCUMENTS

| | | | |
|---|---|---|---|
| 9,002,858 B1* | 4/2015 | Dassa .................. | G06F 16/335 707/750 |
| 2015/0051985 A1* | 2/2015 | Hummel ............ | G06Q 30/0275 705/14.71 |
| 2015/0294377 A1* | 10/2015 | Chow ................ | G06Q 30/0282 705/347 |
| 2016/0224557 A1* | 8/2016 | Chi ........................ | G06F 16/972 |
| 2017/0178181 A1* | 6/2017 | Liu ..................... | G06Q 30/0246 |

\* cited by examiner

*Primary Examiner* — Bruce M Moser
(74) *Attorney, Agent, or Firm* — Fish & Richardson P.C.

(57) ABSTRACT

Methods, systems, and apparatus, including computer programs encoded on a computer storage medium, for optimizing decision systems. In some implementations, methods can include receiving a component request specifying a maximum number of digital components that are capable of being presented on a particular electronic document being rendered at a client device. A ranking score for the given digital component is determined based on a maximum interaction increase factor of formatting available to be applied to the given digital component, the current eligibility value, and the historical eligibility value data. The given digital component is ranked among other available digital components based on the determined ranking score. The given digital component is selected for distribution based on the ranking score of the given digital component being included in the maximum number of highest ranked digital components. The given digital component is transmitted to a client device.

17 Claims, 4 Drawing Sheets

OPTIMIZED DIGITAL COMPONENT ANALYSIS SYSTEM

CROSS-REFERENCE TO RELATED APPLICATION

This application claims priority to U.S. Provisional Application No. 62/406,660, filed on Oct. 11, 2016. The disclosure of the prior application is considered part of and is incorporated by reference in the disclosure of this application.

BACKGROUND

This specification relates to optimizing decision systems. Online networks have enabled communication between millions of machines that are located across the globe. The communication between these machines, and the time within which decisions must be made in order for the appropriate information to be presented at the appropriate time requires machine decision systems to make decisions as to what should be presented in a very short period of time (e.g., less than a second), and much more quickly than a human could make these decisions.

SUMMARY

In general, one innovative aspect of the subject matter described in this specification can be embodied in methods that include the actions of receiving a component request specifying a maximum number of digital components that are capable of being presented on a particular electronic document being rendered at a client device; obtaining a current eligibility value for a given digital component; obtaining historical eligibility value data for the given digital component; determining a ranking score for the given digital component based on a maximum interaction increase factor of formatting available to be applied to the given digital component, the current eligibility value, and the historical eligibility value data, wherein ranking score is based on a difference between the current eligibility value and a corresponding probabilities derived from the historical eligibility value data; ranking the given digital component among other available digital components based on a comparison of the determined ranking score for the given digital component and ranking scores of the other available digital components; determining, based on the ranking, that the given digital component rank is included the maximum number of highest ranked digital components; selecting the given digital component for distribution in response to the component request based on the ranking score of the given digital component being included in the maximum number of highest ranked digital components; and transmitting the given digital component to a client device identified in the component request based on the selection of the given digital component for distribution. Other embodiments of this aspect include corresponding systems, apparatus, and computer programs, configured to perform the actions of the methods, encoded on computer storage devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
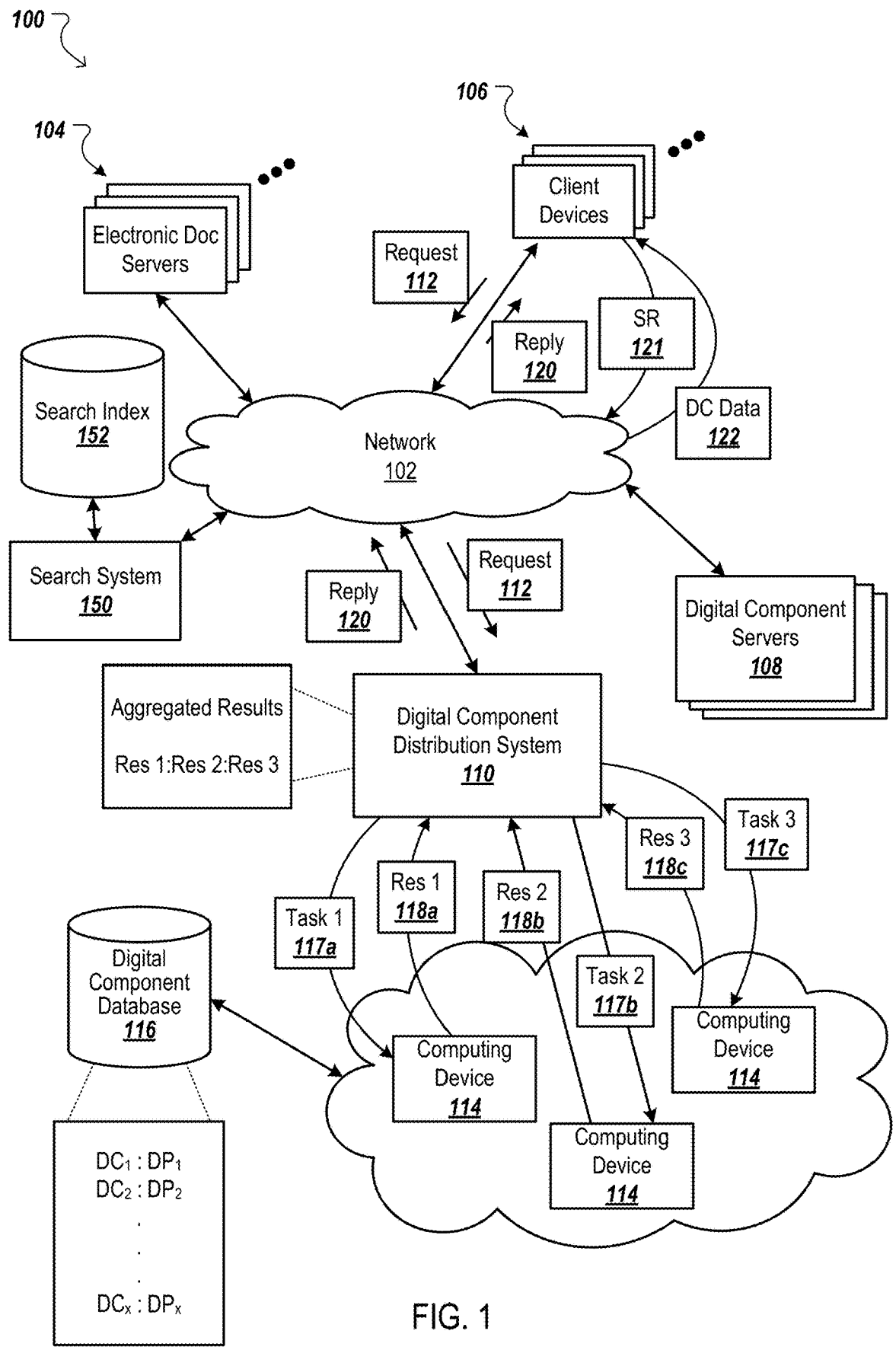
FIG. 1 is a block diagram of an example environment in which digital components are distributed for presentation with electronic documents.

FIG. 1 is a block diagram of an example environment 100 in which digital components are distributed for presentation with electronic documents. The example environment 100 includes a network 102, such as a local area network (LAN), a wide area network (WAN), the Internet, or a combination thereof. The network 102 connects electronic document servers 104, client devices 106, digital component servers 108, and a digital component distribution system 110 (also referred to as a component distribution system). The example environment 100 may include many different electronic document servers 104, client devices 106, and digital component servers 108.

A client device 106 is an electronic device that is capable of requesting and receiving resources over the network 102. Example client devices 106 include personal computers, mobile communication devices, and other devices that can send and receive data over the network 102. A client device 106 typically includes a user application, such as a web browser, to facilitate the sending and receiving of data over the network 102, but native applications executed by the client device 106 can also facilitate the sending and receiving of data over the network 102.

An electronic document is data that presents a set of content at a client device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 106 by electronic document servers 104 ("Electronic Doc Servers"). For example, the electronic document servers 104 can include servers that host publisher websites. In this example, the client device 106 can initiate a request for a given publisher webpage, and the electronic server 104 that hosts the given publisher webpage can respond to the request by sending machine executable instructions that initiate presentation of the given webpage at the client device 106.

In another example, the electronic document servers 104 can include app servers from which client devices 106 can download apps. In this example, the client device 106 can download files required to install an app at the client device 106, and then execute the downloaded app locally.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include one or more tags or scripts that cause the client device 106 to request content from the data source when the given electronic document is processed (e.g., rendered or executed) by a client device 106. The client device 106 integrates the content obtained from the data source into the given electronic document to create a composite electronic document including the content obtained from the data source.

In some situations, a given electronic document can include one or more digital component tags or digital component scripts that reference the digital component distribution system 110. In these situations, the digital component tags or digital component scripts are executed by the client device 106 when the given electronic document is processed by the client device 106. Execution of the digital component tags or digital component scripts configures the client device 106 to generate a request for one or more digital components 112 (referred to as a "component request"), which is transmitted over the network 102 to the digital component distribution system 110. For example, a digital component tag or digital component script can enable the client device 106 to generate a packetized data request including a header and payload data. The component request 112 can include event data specifying features such as a name (or network location) of a server from which the digital component is being requested, a name (or network location) of the requesting device (e.g., the client device 106), and/or information that the digital component distribution system 110 can use to select one or more digital components provided in response to the request. The component request 112 is transmitted, by the client device 106, over the network 102 (e.g., a telecommunications network) to a server of the digital component distribution system 110.

The component request 112 can include event data specifying other event features, such as the electronic document being requested and characteristics of locations of the electronic document at which digital components can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the digital component distribution system 110. Similarly, event data specifying keywords associated with the electronic document ("document keywords") or entities (e.g., people, places, or things) that are referenced by the electronic document can also be included in the component request 112 (e.g., as payload data) and provided to the digital component distribution system 110 to facilitate identification of digital components that are eligible for presentation with the electronic document. The event data can also include a search query that was submitted from the client device 106 to obtain a search results page, and/or data specifying search results and/or textual, audible, or other visual content that is included in the search results.

Component requests 112 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 112 can be transmitted, for example, over a packetized network, and the component requests 112 themselves can be formatted as packetized data having a header and payload data. The header can specify a destination of the packet and the payload data can include any of the information discussed above.

The component distribution system 110 chooses digital components that will be presented with the given electronic document in response to receiving the component request 112 and/or using information included in the component request 112. In some implementations, a digital component is selected (using the techniques described herein) in less than a second to avoid errors that could be caused by delayed selection of the digital component. For example, delays in providing digital components in response to a component request 112 can result in page load errors at the client device 106 or cause portions of the electronic document to remain unpopulated even after other portions of the electronic document are presented at the client device 106. Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document is no longer presented at the client device 106 when the digital component is provided.

In some implementations, the digital component distribution system 110 is implemented in a distributed computing system that includes, for example, a server and a set of multiple computing devices 114 that are interconnected and identify and distribute digital component in response to requests 112. The set of multiple computing devices 114 operate together to identify a set of digital components that are eligible to be presented in the electronic document from among a corpus of millions of available digital components (DC1-$x$). The millions of available digital components can be indexed, for example, in a digital component database 116. Each digital component index entry can reference the corresponding digital component and/or include distribution parameters (DP1-DPx) that contribute to (e.g., condition or limit) the distribution/transmission of the corresponding digital component. For example, the distribution parameters can contribute to the transmission of a digital component by requiring that a component request include at least one criterion that matches (e.g., either exactly or with some pre-specified level of similarity) one of the distribution parameters of the digital component.

In some implementations, the distribution parameters for a particular digital component can include distribution keywords that must be matched (e.g., by electronic documents, document keywords, or terms specified in the component request 112) in order for the digital component to be eligible for presentation. In other words, the distribution parameters are used to trigger distribution (e.g., transmission) of the digital components over the network 102. The distribution parameters can also require that the component request 112 include information specifying a particular geographic region (e.g., country or state) and/or information specifying that the component request 112 originated at a particular type of client device (e.g., mobile device or tablet device) in order for the digital component to be eligible for presentation. The distribution parameters can also specify an eligibility value (e.g., ranking score, bid, or some other specified value) that is used for evaluating the eligibility of the digital component for distribution/transmission (e.g., among other available digital components), as discussed in more detail below. In some situations, the eligibility value can specify an amount that will be submitted when a specific event is attributed to the digital component (e.g., when an application is installed at a client device through interaction with the digital component or otherwise attributable to presentation of the digital component).

The identification of the eligible digital component can be segmented into multiple tasks 117a-117c that are then assigned among computing devices within the set of multiple computing devices 114. For example, different computing devices in the set 114 can each analyze a different portion of the digital component database 116 to identify various digital components having distribution parameters that match information included in the component request 112. In some implementations, each given computing device in the set 114 can analyze a different data dimension (or set of dimensions) and pass (e.g., transmit) results (Res 1-Res 3) 118a-118c of the analysis back to the digital component distribution system 110. For example, the results 118a-118c provided by each of the computing devices in the set 114 may identify a subset of digital components that are eligible for distribution in response to the component request and/or a subset of the digital components that have certain distribution parameters. The identification of the subset of digital components can include, for example, comparing the event data to the distribution parameters, and identifying the subset of digital components having distribution parameters that match at least some features of the event data.

The digital component distribution system 110 aggregates the results 118a-118c received from the set of multiple computing devices 114 and uses information associated with the aggregated results to select one or more digital components that will be provided in response to the request 112. For example, the digital component distribution system 110 can select a set of winning digital components (one or more digital components) based on the outcome of one or more component evaluation processes, as discussed below. In turn, the digital component distribution system 110 can generate and transmit, over the network 102, reply data 120 (e.g., digital data representing a reply) that enables the client device 106 to integrate the set of winning digital components into the given electronic document, such that the set of winning digital components and the content of the electronic document are presented together at a display of the client device 106.

In some implementations, the client device 106 executes instructions included in the reply data 120, which configures and enables the client device 106 to obtain the set of winning digital components from one or more digital component servers. For example, the instructions in the reply data 120 can include a network location (e.g., a Uniform Resource Locator (URL)) and a script that causes the client device 106 to transmit a server request (SR) 121 to the digital component server 108 to obtain a given winning digital component from the digital component server 108. In response to the request, the digital component server 108 will identify the given winning digital component specified in the server request 121 (e.g., within a database storing multiple digital components) and transmit, to the client device 106, digital component data (DC Data) 122 that presents the given winning digital component in the electronic document at the client device 106.

To facilitate searching of electronic documents, the environment 100 can include a search system 150 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 152 (e.g., hardware memory device(s)). Data that are associated with an electronic document is data that represents content included in the electronic document and/or metadata for the electronic document.

Client devices 106 can submit search queries to the search system 150 over the network 102. In response, the search system 150 accesses the search index 152 to identify electronic documents that are relevant to the search query. The search system 150 identifies the electronic documents in the form of search results and returns the search results to the client device 106 in a search results page. A search result is data generated by the search system 150 that identifies an electronic document that is responsive (e.g., relevant) to a particular search query, and includes an active link (e.g., hypertext link) that causes a client device to request data from a specified network location (e.g., URL) in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the client device 106. In some situations, the search system 150 can be part of, or interact with, an application store (or an online portal) from which applications can be downloaded for install at a client device 106 in order to present information about downloadable applications that are relevant to a submitted search query. Like other electronic documents, search results pages can include one or more slots in which digital components (e.g., advertisements, video clips, audio clips, images, or other digital components) can be presented.

In some implementations, the digital component distribution system 110 may determine how many digital components to provide for presentation with a given electronic document based on an analysis of the eligible digital components. For example, even where multiple different digital components have been requested for presentation with the given electronic document, the DCDS 110 may decide to provide fewer than the number of digital components requested based on the analysis. The analysis may also decide to provide no digital components in response to a request or the full number of digital components requested based on the analysis technique discussed below.

The analysis techniques described below can consider, for example, a position within the electronic document at which digital components will be presented, formatting that can be dynamically applied to each of the digital components (e.g., each of which changes the visual attributes of the digital components), and various other factors to arrive at a virtual component score (also referred to as a ranking score) that is used to determine which digital components (if any) will be presented with the electronic document. Further, as described in detail with reference to FIG. 3, the DCDS 110 can compute a submission amount (e.g., a payment) that must be submitted (e.g., by a provider of the digital component) for presentation of (or interaction with) each of the digital components that are presented with the electronic document.

Figure 2:
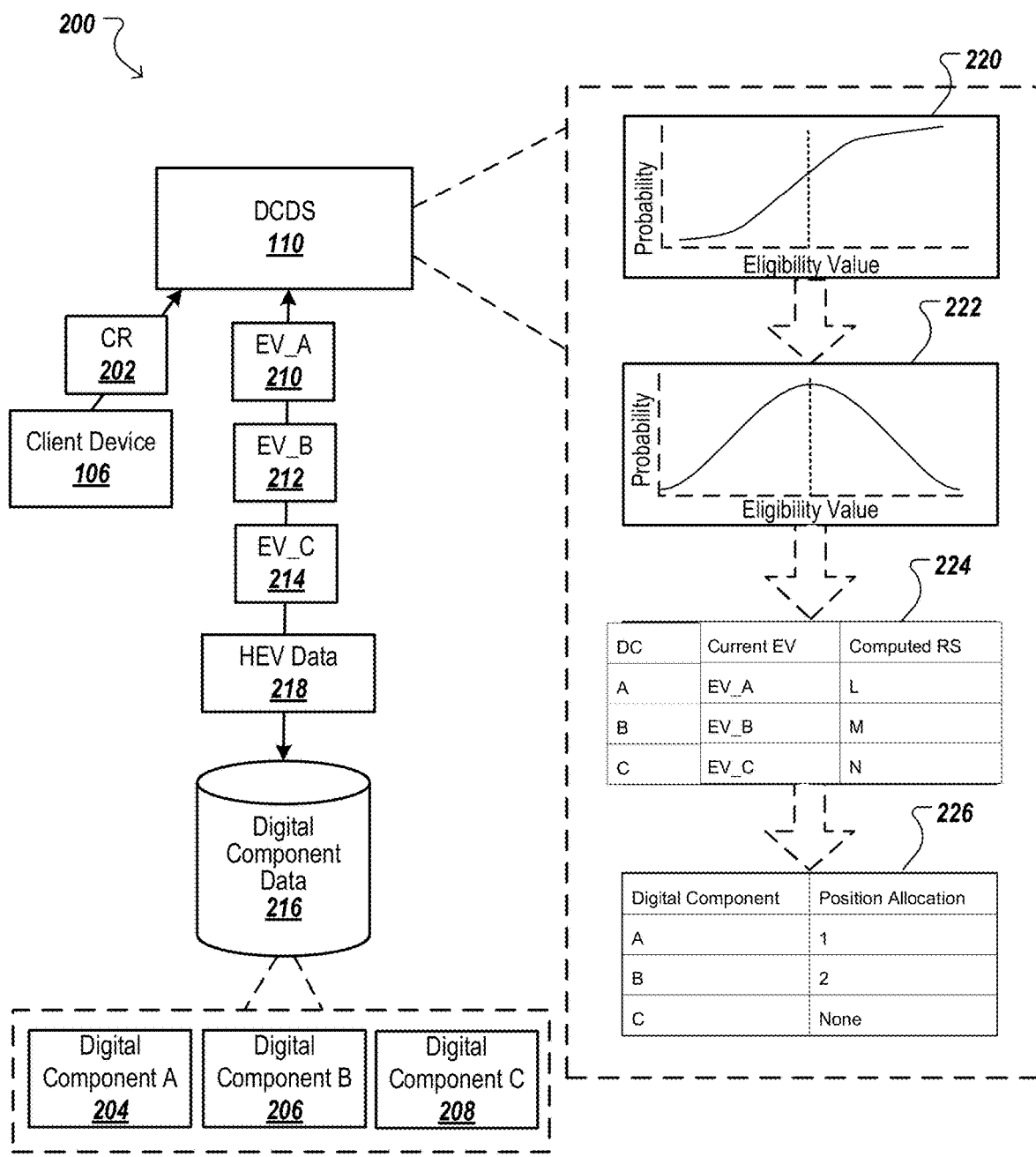
FIG. 2 is an example data flow for optimizing digital component analysis and distribution.

FIG. 2 is an example data flow 200 for optimizing digital component analysis and distribution. The data flow 200 can begin with the DCDS 110 receiving a component request ("CR") 202 from a client device 106. As noted above, the component request 202 can include information that facilitates analysis of digital components and automated decisions as to which digital components are provided in response to the component request 202. For example, the component request 202 can include data (e.g., keywords or phrases) specifying one or more characteristics that are related to an electronic document with which the requested digital components will be presented. The component request 202 can also specify a maximum number of digital components that are able to be presented in presentation positions of the electronic document. For example, for the purposes of the following discussion, we can assume that the component request 202 specifies that a maximum of three digital components can be presented in presentation positions of the electronic document. In this example, a maximum of three digital components can be selected for presentation in response to the component request 202. Fewer than three digital components can also be selected for presentation in response to the component request 202.

Based at least in part on the information included in the component request 202, the DCDS 110 identifies eligible digital components that are eligible to be provided in response to the component request 202. For example, the DCDS 110 can use keywords or other information specified by (or related to) the component request 202 (e.g., geographic information or time of day information) to identify eligible digital components (e.g., digital components having distribution parameters that are matched by the information included in the component request 202). In the present example, assume that Digital Component A 204, Digital Component B 206, and Digital Component C 208 are eligible to be provided for presentation in response to the component request 202.

The DCDS 110 obtains eligibility values that have been specified for the respective eligible digital components. As discussed above, the eligibility values are values that are used to evaluate the distribution eligibility of each digital component relative to other available digital components. For example, a digital component having a highest eligibility value (e.g., among other available digital components) will generally be distributed in response to a request over another digital component having a lower eligibility value.

The eligibility values can be obtained, for example, from a digital component data store 216 that stores digital component data, such as digital components (or information identifying digital components), eligibility values for the digital components, distribution parameters for the digital components, and historical information about the digital components (e.g., historical eligibility values for the digital components, information specifying user interactions with the digital components, etc.) The eligibility values can also be obtained from a source of the digital component. For example, when the DCDS 110 receives the component request 202, the DCDS 110 can transmit an electronic message to the source of a given digital component requesting that the source provide the eligibility value for the given digital component. In response to the request, the source (e.g., provider of the given digital component) can respond to the message providing the DCDS 110 with the eligibility value that is to be used for the current component request 202. In the present example, assume that EV_A 210 is obtained for Digital Component A 204, EV_B 212 is obtained for Digital Component B 206, and EV_C 214 is obtained for Digital Component C 208, and that the eligibility values are obtained from the data store 216.

The DCDS 110 also obtains, from the EV Data Store 216, historical eligibility value data ("HEV Data") 218 for each of the digital components 204, 206, and 208. The historical eligibility value data 218 can include a set of (or distribution of) previous eligibility values 218 that were used to evaluate the eligibility of each of the digital components 204, 206, and 208 (or other digital components provided by the providers of the digital components 204, 206, and 208). The set of previous eligibility values 218 that are obtained for each of the digital components can specify, for example, one or more of all previous eligibility values that have been submitted by a provider of the digital component, all eligibility values submitted by the provider over a specified period (e.g., 1 week, 1 month, or 1 year), recent eligibility values (e.g., a most recent or sequence of recent eligibility values), and/or eligibility values that the provider has submitted for component requests associated with a particular electronic document or publisher of electronic documents. Other segments of previous eligibility values can be defined/retrieved as required or desired. For example, the set of previous eligibility values can include only those eligibility values that were submitted by a particular digital component or group of digital components provided by a given digital component source (or provider).

In some implementations, the set of previous eligibility values that are obtained by the DCDS 110 in response to the component request 202 can specify all eligibility values that the providers of the digital components 204, 206, and 208 have submitted for component requests associated with the specific publisher of the electronic document identified by the component request 202. For example, assume that the component request 202 specifies that the electronic document with which the requested digital components will be presented is example.com. In this example, the DCDS 110 can request, from the Digital Component Data Store 216, the historical eligibility value data 218 that includes previous eligibility values that were previously submitted by the providers of the digital components 204, 206, and 208 for previous component requests that specify the domain example.com and/or known related resources (e.g., resources in another domain that is registered to a same publisher as example.com).

In some implementations, the HEV data 218 includes the eligibility values that were specified for a particular distribution parameter (e.g., keyword). For example, assume that the keyword specified in the current component request 202 is "tiger" (or another term matching "tiger"). In this example, the HEV data 218 can include the previous eligibility values that were submitted by providers when previous component requests specified the keyword "tiger." In some implementations, the previous eligibility values included in the HEV data 218 will only be those eligibility values submitted for the previous component requests that specified the keyword "tiger" (or a matching term).

Using the HEV data 218, the DCDS 110 determines a cumulative distribution function ("CDF") 220 of the previous eligibility values that are included in the HEV Data 218 for each of the digital components 204, 206, and 208. In some implementations, the CDF 220 for a particular digital component (or provider of the particular digital component) represents and provides a probability that an eligibility value submitted for the particular digital component (or by the provider of the particular digital component) will be less than or equal to the various values included in the CDF 220. For example, for a particular eligibility value Y in the CDF 220, the CDF 220 provides a probability that an eligibility value received for the particular digital component or from the provider of the particular digital component will be less than or equal to the particular eligibility value Y. In other words, the probability distribution function accumulates the probability that the particular eligibility value will be less than or equal to each possible value.

The DCDS 110 uses the CDF 220 for each of the digital components 204, 206, and 208, to determine a probability density function ("PDF") 222 for each of the digital components 204, 206, and 208 (or each of the providers of the digital components). In some implementations, the DCDS 110 determines the PDF 222 for a particular digital component (or particular provider of digital components) based on a derivative of the CDF 220 for the particular digital component (or provider of digital components). For example, relationship (1) can be used to determine the PDF 222 based on a CDF 220.

$$PDF_i(EV) = \frac{d}{dEV} CDF_i(EV) \quad (1)$$

where, $PDF_i(EV)$ is the probability density function for digital component i (or digital component provider) as a function of eligibility value (EV); and $d/dEV(CDF_i(EV))$ is the derivative of the cumulative distribution function for digital component i as a function of eligibility value (EV).

The DCDS 110 proceeds to determine a ranking score for each of the digital components 204, 206, or 208 or each provider of the digital components. The ranking score is a value used to create a ranked order of the digital components for purposes of determining which of the digital components (if any), will be incorporated into an electronic document at a client device. In some implementations, the ranking score for each digital component can be based on a function of the current eligibility value obtained for the digital component (or by the provider of the digital component) for the current component request, the CDF for the digital component (or provider of the digital component), the PDF for the digital component (or provider of the digital component), and effects of various formatting on activity generated by the digital component (e.g., user interactions with the digital components or post presentation activities, such as conversions). For example, relationship (2) can be used to determine the ranking score for a particular digital component or provider of digital components.

$$RS_i = \phi^*_{fi}\left(EV_i - \frac{1 - CDF_i(EV_i)}{PDF_i(EV_i)}\right) \quad (2)$$

where, $\phi^*_{fi}$ is a maximum interaction increase factor for formatting that is available to be applied to the digital component i (discussed further below);

$RS_i$ is the ranking score of the digital component (i) (or digital component provider);

$EV_i$ is the current eligibility value obtained for the digital component (i) (or component provider);

$CDF_i(EV)$ is the value provided by the cumulative distribution function for digital component i (or digital component provider) at the eligibility value $EV_i$; and $PDF_i(EV_i)$ is the value provided by the probability density function for digital component i (or digital component provider) at the eligibility value $EV_i$.

In some implementations, $EV_i$ for digital component i or a provider of a digital component i is set equal to, or determined based on, a current eligibility value obtained for a current evaluation of the digital component (e.g., a current instance of digital component evaluation for purposes of selecting a digital component to be incorporated into an electronic document in response to a particular component request). For example, assume that the current eligibility value for digital component A 204 (e.g., submitted by the provider of digital component A 204) is 2.00. In this example, the $EV_i$ can be set to 2.00 or determined using this eligibility value, as described below.

In some implementations, $EV_i$ for digital component i is determined using the current eligibility value submitted by the provider of digital component i (or obtained from the data store) and one or more other values. For example, assume that $EV_i$ is determined, at least in part, by a product of a quality factor q for digital component i (or a provider of digital component i) and the current eligibility value submitted for the digital component i. To illustrate, assume that the provider of digital component A 204 submitted an eligibility value of 2.00 for use with respect to the component request 202, and that the provider of digital component A 204 (or digital component A) has a quality factor of 0.8 (e.g., on a scale of 0.0-1.0). In this example, $EV_i$ can be determined to be 1.60 (i.e., 2.00*0.8), which can be referred to as a quality-adjusted eligibility value. In some implementations, the quality factor for a given digital component can be set equal to (or determined based on a function of) a historical interaction rate of the given digital component (e.g., historical rate of user interaction with the given digital component, such as a click rate) and/or the historical interaction rate for various digital components provided by a same provider as the given digital component. For example, if the given digital component has a historical interaction rate of 0.03 (e.g., indicating that 3 out of 100 users interact with the given digital component when presented), this value can be used as the quality factor for the given digital component.

For purposes of example, the discussion that follows generally refers to an eligibility value, which can either be the current eligibility value submitted for use with respect to the component request 202 or a quality-adjusted value that is based on the current eligibility value and the quality factor for the digital component or provider of the digital component (unless specified otherwise). Note that quality factors can be obtained from a data store, such as the digital component data store 216 or received from another data processing apparatus. The quality factor can represent a relative measure of quality of digital components provided by a particular provider. The quality factor can take into account, for example, user activity that is triggered by digital components provided by the particular provider. For example, the quality factor can be set equal to a rate of user interaction (e.g., click rate or conversion rate) attributed to digital components provided by the particular provider. Alternatively, the quality factor can be set equal to a value that is proportional to the rate of user interaction or some other value that is computed using the rate of user interaction.

The value of $\phi^*_{fi}$ can be determined by evaluating the increase in user interactions provided by each formatting that is available to be applied to the digital component i, and identifying the formatting that will provide the largest increase in user interactions (e.g., relative to a level of user interactions attributed to the digital component without any formatting applied). For example, the DCDS 110 can use historical interaction data for the digital component i, to identify different interaction rates for the digital component i when presented with each of the available formatting options. Based on a comparison of these interaction rates, the DCDS 110 can select the particular formatting (e.g., individual formatting option or combination of formatting options) that provides the largest increase in user interactions over the unformatted digital component.

For example, assume that formatting options of bolded text, inclusion of click to call control (e.g., a control that initiates a telephone call in response to user interaction with the control), and inclusion of a map element (e.g., an image of a map that shows a location relevant to the digital component) are three formatting options that a particular digital component provider has authorized to be applied to a particular digital component. In this example, the DCDS 110 can utilize historical interaction data for the particular digital component to determine an interaction rate for the particular digital component without any of the formatting applied and respective interaction rates for the particular digital component when presented with each of the formatting options identified above. The DCDS 110 can compare these interaction rates to identify the formatting option that provides the largest increase in the interaction rate for the particular digital component and use that interaction rate to determine $\phi^*_{fi}$. In some implementations, $\phi^*_{fi}$ is a ratio of the interaction rate of the digital component i when formatted using the formatting having the highest interaction rate (e.g., among all available formatting for digital component i) and the interaction rate of the digital component i when none of the available formatting is applied. The value of $\phi^*_{fi}$ can be determined using relationship (3).

$$\phi^*_{fi} = \frac{IR_{fi}}{IF_{f0}} \quad (3)$$

where, $\phi^*_{fi}$ is the maximum increased interaction factor for a formatted version of the digital component i;

$IR_{fi}$ is the interaction rate (e.g., click rate) for the digital component i when formatted according to the format that provides the highest interaction rate for the digital component i; and $IR_{f0}$ is the interaction rate (e.g., click rate) for the digital component i when none of the available formatting is applied to the digital component i.

In some implementations, the relationship used to determine the ranking score of a particular digital component (or provider of a digital component) can be based on the characteristics of relationship (2). For example, if relationship (2) is an increasing function of $EV_i$, then the $RS_i$ obtained from relationship (2) can be used as the ranking score for the digital component or provider of the digital component. If relationship (2) is not an increasing function of $EV_i$, other relationships can be used to determine the ranking score of a digital component or provider of the digital component. For example, assume that relationship (2) is not an increasing function of $EV_i$. In this example, relationship (4) can be used to determine $RS_i$.

$$RS_i = \phi^*_{fi} * c_i(CDF_i(EV_i)) \quad (4)$$

where, $RS_i$ is the value ranking score of digital component i (or the provider of the digital component);

$\phi^*_{fi}$ is the maximum interaction increase factor for a formatted version of the digital component i;

$CDF_i(EV_i)$ is the value provided by the cumulative distribution function for digital component i (or provider of the digital component) at $EV_i$; and $c_i$ is determined as specified below.

With respect to determining $c_i$, the DCDS 110 utilizes the following definitions:

$$h_i(\theta) = CDF_i^{-1}(\theta) - \frac{1-\theta}{PDF_i(CDF_i^{-1}(\theta))};$$

$$H_i(\theta) = \int_0^\theta h_i(r)dr;$$

$C_i(\theta)$ is the convex hull of $H_i(\theta)$ or the largest convex function satisfying $C_i(\theta) \le H_i(\theta)$ for all $\theta \in [0,1]$; and $$c_i(\theta) = \frac{d}{d\theta} C_i(\theta)$$

where $\theta$ represents the probability that digital component i's is eligibility value $EV_i$ would be no greater than it was given that $EV_i$ is drawn from the cumulative distribution function $CDF_i$.

Using the ranking scores, the DCDS 110 can create a digital component ranking 224 based on the ranking scores ("RS"). For example, assume that a ranking score of L was computed based on EV_A 210, a ranking score of M was computed based on EV_B 212, and a ranking score of N was computed based on EV_C 214 and that L>M>N. In this example, digital component A 204 has a highest ranking score and highest rank (e.g., rank of 1), digital component B 206 has a second highest ranking score and second highest rank (e.g., rank of 2), and digital component C 208 has a third highest ranking score and third highest rank (e.g., rank of 3), as illustrated by the digital component ranking 224.

The DCDS 110 uses the digital component ranking 224 and ranking scores to select the number of digital components that will be incorporated into the electronic document in response to the component request. In some implementations, the DCDS 110 selects between zero and the maximum number of digital components specified by the component request 202 to be incorporated into the electronic document in response to the component request 202. The number of digital components selected to be provided in response to the digital component request 202 can be selected, for example, based on the ranking scores for the digital components.

For example, if the number of digital components having positive ranking scores (e.g., greater than zero) meets or exceeds the maximum number of digital components specified by the component request 202, the maximum number of digital components specified by the component request 202 can be incorporated into the electronic document. When the number of digital components having positive ranking scores is less than the maximum number of digital components specified by the component request 202, the number of digital components selected to be incorporated into the electronic document can be limited to the number of digital components having positive ranking scores.

To illustrate with respect to the example data flow 200, up to three digital components can be incorporated into the electronic document in response to the component request 200 because the component request 202 specifies a maximum of three digital components. Therefore, the DCDS 110 can select between zero and three digital components to be transmitted to a client device in response to the component request 202. For purposes of example, assume that digital components A and B were each determined to have positive ranking values, while digital component C was determined to have a negative ranking value. In this example, Digital Components A and B (204 and 206) would be selected for presentation, while the Digital Component C 208 would not be selected for presentation because it has a negative ranking value. As such, the DCDS 110 would determine, based on the analysis of these ranking values, that only two digital components will be provided even though up to three digital components could have been provided.

In some implementations, the presentation positions that are allocated to the digital components (or providers) can be selected based on the ranking scores that were determined for the digital components. Continuing with the example above and as illustrated by table 226, Digital Component A 204 can be presented in a first presentation position (e.g., a highest position on the electronic document or most visually prominent position) because Digital Component A 204 has the highest determined ranking score (e.g., relative to the other digital components in this example), and Digital Component B 206 can be presented in the second presentation position (e.g., a second highest position on the electronic document or second most visually prominent position) because Digital Component B 206 has the second highest determined ranking score. The DCDS 110 can provide instructions that cause the selected digital components to be provided for presentation at the client device 106 according to the selected allocations.

In some implementations, the digital components that are distributed by the DCDS 110 are formatted according to the format (or formats) that provide the maximum interaction increase factor (e.g., $\phi^*_{fi}$) for the digital component. For example, assume that bold text and inclusion of a click to call control were determined to provide the highest $\phi^*_{fi}$ for Digital Component A 204. In this example, the DCDS 110 can apply these formats to Digital Component A 204 when Digital Component A 204 is distributed to the client device 106.

The formats can be applied to the digital components, for example, by dynamically modifying the visual appearance and/or code of the digital component prior to transmitting the digital component to the client device 106. For example, some or all of the text of Digital Component A 204 can be bolded (e.g., by modifying the code of the digital component), and code that causes the click to call control to be integrated into Digital Component A 204 can be added to the code that defines Digital Component A 204. As such, multiple different versions of digital component A (e.g., having different visual features and/or contents) can be generated at run-time, even though only a single version of Digital Component A 204 needs to be stored. Thus, the dynamic formatting of digital components enables the distribution of multiple different versions of a particular digital component without requiring each different version of the digital component to be stored. As such, the number of digital components that need to be evaluated at run-time is reduced, thereby reducing the amount of time and processing resources required to select a digital component for distribution. The dynamic application of formats to the digital components also reduces the amount of storage (e.g., hardware memory) required to facilitate distribution of these different versions of digital components because a single digital component can be dynamically formatted to create the multiple different versions of the digital component rather than storing each different version of the digital component.

The DCDS 110 also determines a submission amount (e.g., cost, price, or other specified amount of some item) that a provider must submit for distribution of each digital component. This is discussed in detail with reference to FIG. 3.

Figure 3:
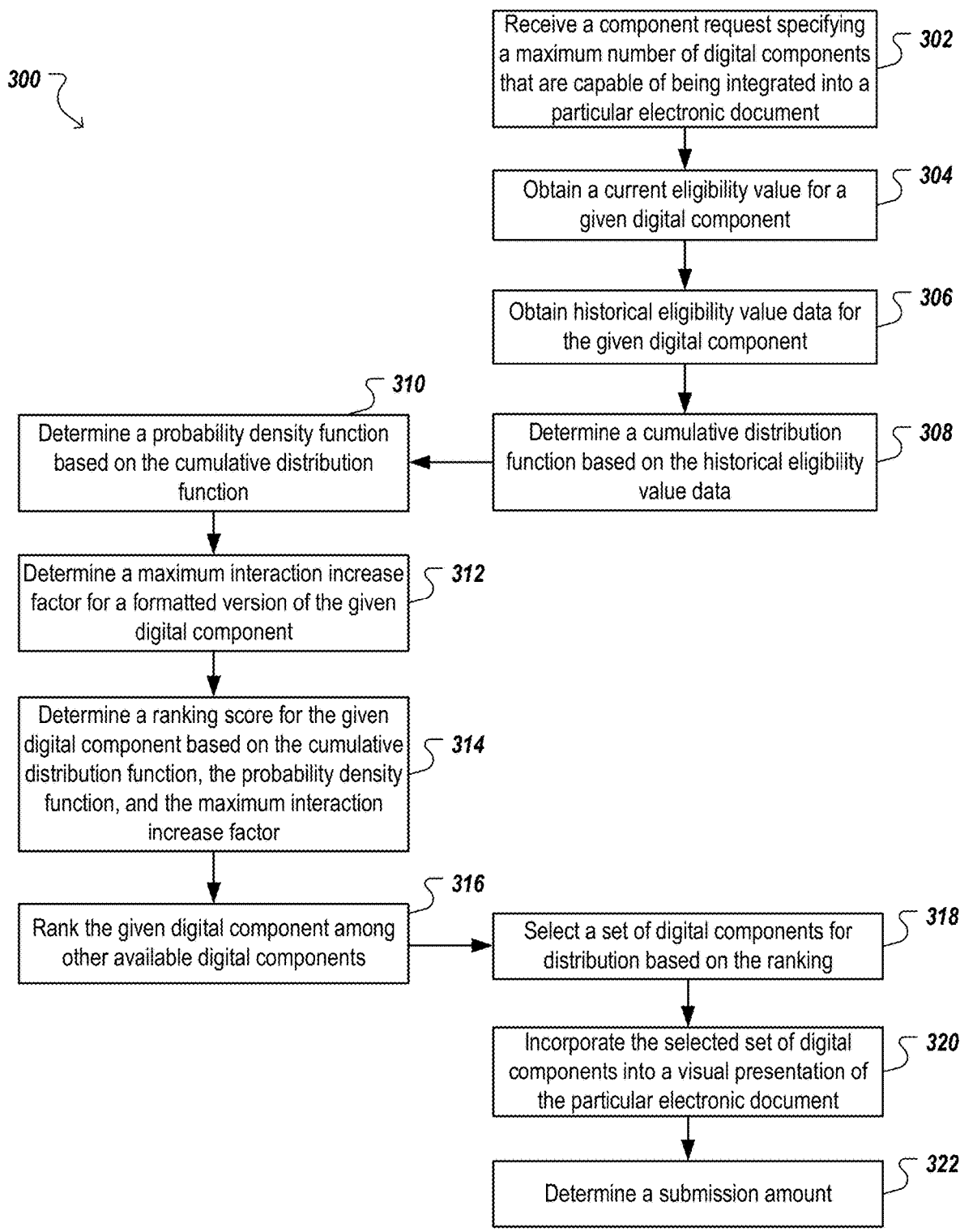
FIG. 3 is a flow chart of an example process for optimizing digital component analysis and distribution.
Figure 4:
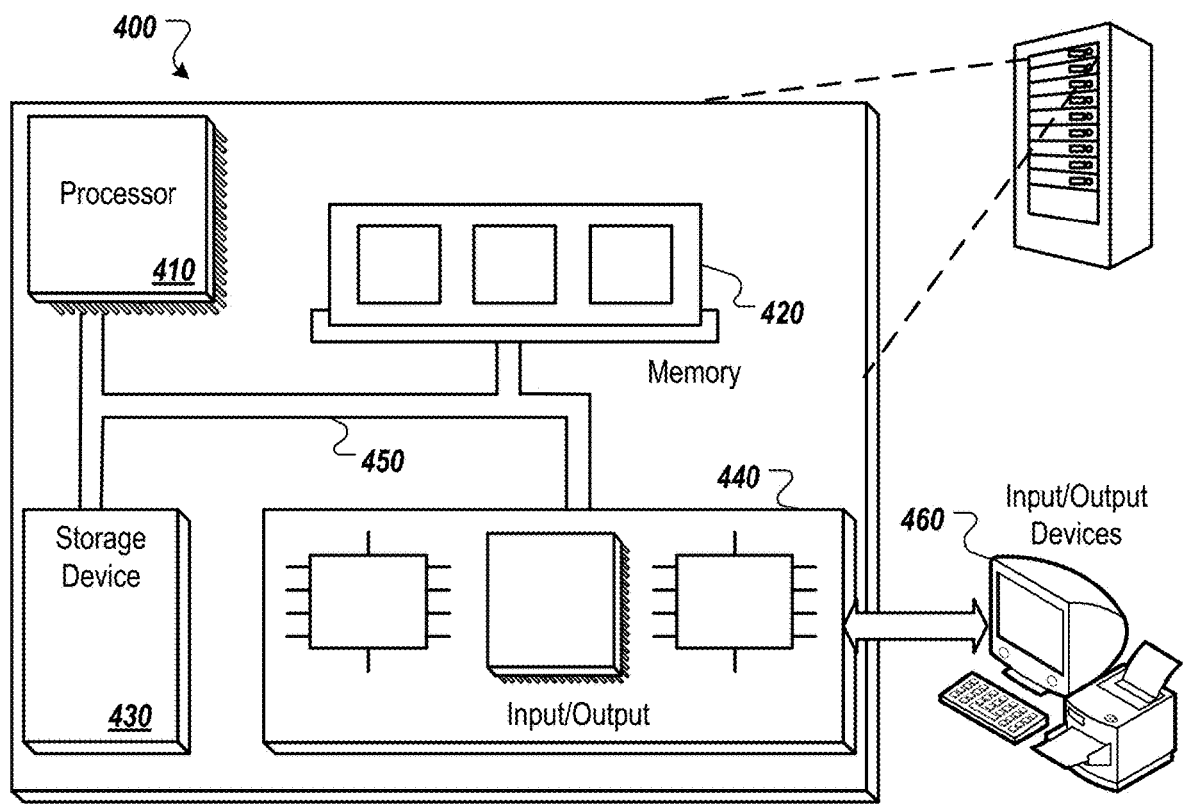
FIG. 4 is a block diagram of an example computing system.

FIG. 3 is a flow chart of an example process 300 for optimizing digital component analysis and distribution. In some implementations, the process 300 can be implemented by one or more servers. For example, the process 300 can be implemented by the DCDS 110 of FIG. 1. In some implementations, the process 300 can be implemented as instructions stored on a non-transitory computer readable medium, and when the instructions are executed by one or more servers, the instructions can cause the one or more servers to perform operations of the process 300.

A component request is received (302). In some implementations, the received component request specifies a maximum number of digital components that are capable of being presented on a particular electronic document being rendered at a client device. For example, as discussed above with reference to FIG. 1, when the particular electronic document is being rendered at the client device, a script in the particular electronic document can cause the client device to initiate a component request that is transmitted to a remote server, and requests that the remote server identify and/or provide one or more digital components that the client device will integrate into the visual presentation of the particular electronic document being rendered. As discussed above, the client device can include various event data in the component request, and can include information specifying the maximum number of digital components that are capable of being presented on the particular electronic document. The component request can also specify the client device that is rendering the particular electronic document so that the remote server can respond to the request with the requested digital components or a location (e.g., URL or server location) from which the client device can obtain the requested digital components (e.g., using a redirect instruction that includes a location of another server that provides the requested digital components).

A current eligibility value is obtained for a given digital component (304). In some implementations, the current eligibility value can be obtained from a provider of a digital component. For example, as discussed above, the provider (or source) of the digital component can be transmitted a message requesting that the provider submit the current eligibility value for a current presentation opportunity. The message can include, for example, information specifying details of the presentation opportunity (e.g., an opportunity to present content at a user device). For example, the message can include any of the event data that was included in a request for content corresponding to the presentation opportunity. In response to the message, the provider can submit a current eligibility value (e.g., a bid or other numerical identifier expressing a relative level of interest in the presentation opportunity), and this current eligibility value can be used to evaluate whether the given digital component will be distributed to the client device for presentation. Alternately, the current eligibility value can be pre-specified (e.g., prior to receipt of a component request identifying the presentation opportunity), stored in a data store as described above, and obtained from the data store when a component request is received.

Historical eligibility value data is obtained for the given digital component (306). As described above, the historical eligibility value data includes data specifying historical eligibility values that were previously obtained from a provider of the given digital component. For example, the historical eligibility values may be eligibility values that were previously used to evaluate the given digital component for distribution in response to previously received component requests. Additionally, or alternatively, the historical eligibility values can be eligibility values for any (or some specified proper subset of) digital components provided by the provider of the given digital component. For example, the historical eligibility values may include only those eligibility values that were submitted by the provider (or otherwise obtained) for evaluations of digital components when the component request included a specific keyword. More specifically, the historical eligibility values obtained may be those eligibility values that were submitted by the provider (or otherwise obtained) for previous component requests that included a same keyword as the current component request.

A cumulative distribution function is determined based on the historical eligibility value data (308). In some implementations, the cumulative distribution function can be represented as a graph that shows a probability of the provider submitting each eligibility value over a range of eligibility values. For example, for each particular eligibility value in the range, the cumulative distribution function will provide a corresponding probability that the eligibility value submitted by the provided for the current component request will be equal to or less than that particular eligibility value. FIG. 2 includes an example graphical representation of a cumulative distribution function.

A probability distribution function is computed based on the cumulative distribution function (310). The probability distribution function can be determined, for example, using the cumulative distribution function. For example, the probability distribution function can be determined as the derivative of the cumulative distribution function. The probability distribution function can be determined, for example, using relationship (1).

A maximum interaction increase factor is determined for a formatted version of the given digital component (312). The maximum interaction increase factor can be determined, for example, based on an analysis of interaction rates provided by different versions of the given digital component. In some implementations, an interaction increase factor is determined for each format (and/or combination of formats) that is available to be applied to the given digital component. For example, as discussed above, a different interaction increase factor can be determined for each of three different formats (e.g., changes to the visual presentation of the digital component) that are available to be applied to the given digital component, as well as for each different combination of the formats that are available to be applied to the given digital component. As discussed above, the interaction increase factor for a specific format application can be determined as the ratio of the interaction rate for the given digital component when formatted according to that specific format application relative to the interaction rate of the digital component without any of the available formats applied.

In some implementations, the formats that are available to be applied to the given digital component are specified by the provider, and the formats actually applied are determined at run-time (e.g., when the given digital component is selected for distribution). For example, a provider of the given digital component may specify that the given digital component can be modified to bold text, add a background color, add a click to call control, and/or add a map element showing a location where users can visit the provider. In this example, zero, one or more of these formats can be dynamically applied when the given digital component is selected for distribution in response to a component request, thereby modifying the visual appearance of the given digital component for that component request. In this example, the interaction increase factors for these formats can be determined using historical information specifying user interactions (or rates of interaction) with the digital component as formatted using none, some, and/or all of these formats. For example, a ratio of the rate of interactions with the given digital component when the click to call control was incorporated into the given digital component relative to the rate of interactions with the given digital component can be used to determine the interaction increase factor for the click to control format. Different interaction increase factors can be determined for each combination of available formats (or individual formats), and the highest interaction increase factor can be selected as the maximum. The formatting corresponding to the highest interaction increase factor will be applied to the given digital component for the current component request.

A ranking score is generated based on the current eligibility value, the cumulative distribution function, the probability distribution function, and the maximum interaction increase factor for the given digital component (314). The ranking score can be determined as described above with reference to FIG. 2.

The given digital component is ranked among other available digital components based on the ranking score (316). In some implementations, the digital components are ranked in descending order of ranking scores, such that the digital component having the highest rank is ranked highest, while the digital component having the second highest ranking score is ranked second, and so on.

A set of digital components is selected for incorporation into the electronic document based on the ranking (318). In some implementations, the selected set of digital components includes the given digital component. In other words, the selection of the set of digital components can include the selection of the given digital component for distribution in response to the component request. The set of digital components, including the given digital component, is selected based on each digital component in the set having a rank that is included in the maximum number of highest ranked digital components. For example, when the component request specifies that up to a maximum of three digital components can be provided for presentation in response to the component request, the selected set of digital components can include up to the three highest ranked digital components, as specified by the rankings.

The selected set of digital components is incorporated into a visual presentation of the electronic document (320). The incorporation of the selected set of digital components into the visual presentation of the electronic document can include, for example, transmitting the given digital component, and any other digital components in the set, to a client device identified in the component request based on the selection of the given digital component, and any other digital components, for inclusion in the set and/or distribution to a client device in response to the received component request. In some implementations, the transmission of the given digital component includes transmitting one or more files that enable the client device to present the given digital component with the particular electronic document. In some implementations, the transmission of the given digital component includes transmitting information identifying a location (e.g., URL) from which the client device can obtain the given digital component. For example, the response to the component request that is transmitted to the client device can include a redirect instruction (e.g., an HTTP redirect) that causes the client device to request the given digital component from a different server than the server that selected the given digital component for distribution based on the information in the component request.

A submission amount is determined for incorporation of the given digital component in the electronic document or distribution (322). In some implementations, the submission amount is a cost per interaction amount that the provider of the given digital component must submit when a user interacts with the given digital component when presented in the particular electronic document. The submission amount can be determined, for example, based on the highest eligibility value (e.g., unadjusted eligibility value or bid) that the provider could have submitted that would have resulted in the given digital component to be ranked one position lower than its current ranking.

For example, assume that the given digital component is the highest ranked digital component based on the ranking determined above. In this example, the submission amount for the given digital component can be (or be based on) the highest unadjusted eligibility value that would have resulted in the given digital component being ranked second. The submission amount can be determined, for example, by finding the value of $TV_{i,j+1}$ that satisfies relationship (5), where $TV_{i,j+1}$ is the highest unadjusted eligibility value that would have caused the given digital component i to be allocated a next highest presentation position j+1 than it was allocated, e.g., ranked in a next highest position. This $TV_{i,j+1}$ can be referred to as a trigger point eligibility value (or trigger value ("TV")) because it is the eligibility value that would trigger the digital component i to be allocated a different presentation position (or ranked differently).

$$\phi_i^*\left(TV_{(i,j+1)}q_i - \frac{1 - CDF_i(TV_{(i,j+1)}q_i)}{PDF_i(TV_{(i,j+1)}q_i)}\right) = \phi_{j+1}^*\left(EV_{(i+1)} - \frac{1 - CDF_{(i+1)}(EV_{(i+1)})}{PDF_{(i+1)}(EV_{(i+1)})}\right) \quad (5)$$

where, i+1 denotes the digital component (or provider) that was allocated a next highest presentation position or next highest ranked relative to the given digital component i; and $q_i$ is the quality factor for digital component i (or provider of the digital component i).

The $CDF_{(i+1)}$ and $PDF_{(i+1)}$ of relationship (5) can be determined in the same manner as discussed above with reference to $CDF_i$ and $PDF_i$. Also, in relationship (5), $EV_{i+1}$ can be the quality-adjusted eligibility value for the next highest ranked digital component. In some implementations, the submission amount can be set equal to the $TV_{i,j+1}$ that satisfies relationship (5) or some incremental amount (e.g., 0.01) higher than the determined $TV_{i,j+1}$.

In some implementations, the submission amount can be determined using multiple different trigger eligibility values. For example, a different eligibility trigger value can be determined for each different presentation position that is available on the particular electronic document, and each of these trigger eligibility values can be used to determine the submission amount for the given digital component.

Continuing with the example above, the submission amount for the given digital component can be further determined using the highest unadjusted eligibility values (e.g., eligibility values (or bids) specified by the provider of the given digital component) that would have resulted in the given digital component being allocated other remaining presentation positions of the particular electronic document. More specifically, when the electronic document includes three presentation positions and the given digital component is the highest ranked digital component (e.g., allocated a highest presentation position), the submission amount can be determined based on a weighted sum of the $TV_{i,j+1}$ determined above and $TV_{i,j+2}$, which is the highest unadjusted eligibility value that would have resulted in the given digital component being ranked third in the ranking above (e.g., being allocated the third highest presentation position). $TV_{i,j+2}$ can be set equal to the value that satisfies relationship (6).

$$\phi_i^*\left(TV_{(i,j+2)}q_i - \frac{1 - CDF_i(TV_{(i,j+2)}q_i)}{PDF_i(TV_{(i,j+2)}q_i)}\right) = \phi_{j+1}^*\left(EV_{(i+2)} - \frac{1 - CDF_{(i+2)}(EV_{(i+2)})}{PDF_{(i+2)}(EV_{(i+2)})}\right) \quad (6)$$

where, i+2 denotes the digital component (or provider) that was allocated a third highest presentation position or was third highest ranked relative to the given digital component i; and j+2 denotes the third highest presentation position or ranking.

If additional presentation positions are available on the particular electronic document, additional eligibility values for the digital component i can be determined in a manner similar to that discussed with reference to relationships (5) and (6).

In some implementations, the submission amount for the given digital component can be a weighted average of the trigger eligibility values. Each of the trigger eligibility values can be weighted, for example, using a position normalizer for the position corresponding to the trigger eligibility value. For example, the trigger eligibility value $TV_{i,j+1}$ can be weighted by the position normalizer for the second highest ranked (or second most prominent) presentation position, while $TV_{i,j+2}$ can be weighted by the position normalizer for the third highest ranked (or second most prominent) presentation position.

In some implementations, the submission amount can be determined according to relationship (7).

$$\frac{1}{x_j}\sum_{k=j}^{M}(x_k - x_{(k+1)})TV_{(i,k+1)} \quad (7)$$

where, j represents the presentation position the given digital component was allocated (or the rank of the given digital component);

$x_j$ is the position normalizer for presentation position j;

M is the maximum number of presentation positions available on the particular electronic document; and $TV_{(i,k+1)}$ is the trigger eligibility value that will place the given digital component in position (or rank) k+1.

In some implementations, the position normalizer for M+1 is set equal to zero.

The position normalizer x for a given presentation position is a value that represents the relative performance of digital components that have been presented in the given presentation position. For example, the position normalizer may be set equal to, or determined based on, a ratio of a historical interaction rate for digital components that have been presented in the given presentation position of a given electronic document relative to the historical interaction rate for digital components that have been presented in a reference presentation position of the given electronic document. Assume for purposes of example that the highest ranked presentation position (e.g., most prominent presentation position or the presentation position having a highest interaction rate) is designated as the reference presentation position. In this example, the position normalizer for the highest ranked presentation position will be 1.0, while the position normalizer for each other presentation position on the page can be set equal to $IR_x/IR_r$, where $IR_x$ is the interaction rate for the presentation position for which the position normalizer is being determined, and $IR_r$ is the interaction rate for the reference presentation position.

In some implementations, the provider of the given digital component is provided information identifying the submission amount that must be submitted for distribution of the given digital component. This information can be provided as a digital message that is transmitted to the provider over a network, or visually presented in a graphical user interface that is accessible by the provider.

An electronic document may, but need not, correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:

receiving, from a client device, a component request specifying a maximum number of digital components that are capable of being presented on a particular electronic document being rendered at the client device;

obtaining a current eligibility value for a given digital component;

obtaining historical eligibility value data for the given digital component;

determining a maximum interaction increase factor for the given digital component based on a largest level of increase in user interactions provided by formatting available to be applied to the given digital component;

determining a ranking score for the given digital component based on the maximum interaction increase factor of formatting available to be applied to the given digital component, the current eligibility value, and the historical eligibility value data;

ranking the given digital component among other available digital components based on a comparison of the determined ranking score for the given digital component and ranking scores of the other available digital components;

determining, based on the ranking, that the given digital component rank is included the maximum number of highest ranked digital components;

selecting the given digital component for distribution in response to the component request based on the ranking score of the given digital component being included in the maximum number of highest ranked digital components; and transmitting the given digital component to the client device identified in the component request based on the selection of the given digital component for distribution, wherein determining the maximum interaction increase factor comprises:

evaluating, for each available formatting, an increase in user interactions provided by each available formatting;

identifying, based on the evaluating, the available formatting that provides a largest increase in user interactions relative to a level of user interactions attributed to the given digital component without any formatting applied; and determining the maximum interaction increase factor based on an interaction rate provided by the available formatting that provides a largest increase in user interactions.

2. The method of claim 1, further comprising:

determining a cumulative distribution function based on the historical eligibility value data; and determining a probability density function as a derivative of the cumulative distribution function.

3. The method of claim 1, wherein determining the maximum interaction increase factor based on an interaction rate provided by the available formatting that provides a largest increase in user interactions comprises determining a ratio between an interaction rate for the given digital component when formatted according to the available formatting that provides the highest interaction rate for the given digital component and the interaction rate for the given digital component when none of the available formatting is applied to the given digital component.

4. The method of claim 3, wherein determining the ranking score comprises determining a product of the maximum interaction increase factor and a value provided by the cumulative distribution function at a location corresponding to the current eligibility value of the given digital component.

5. The method of claim 1, further comprising formatting the given digital component according to the available formatting that provides the largest increase in user interactions.

6. The method of claim 5, wherein formatting the given digital component according to the available formatting that provides the largest increase in user interactions comprises dynamically modifying a visual appearance or code of the digital component prior to transmitting the digital component to the client device responsive to the component request.

7. A non-transitory computer readable medium storing instructions that, when executed by one or more computing devices, cause the one or more computing devices to perform operations comprising:

receiving, from a client device, a component request specifying a maximum number of digital components that are capable of being presented on a particular electronic document being rendered at the client device;

obtaining a current eligibility value for a given digital component;

obtaining historical eligibility value data for the given digital component;

determining a maximum interaction increase factor for the given digital component based on a largest level of increase in user interactions provided by formatting available to be applied to the given digital component;

determining a ranking score for the given digital component based on the maximum interaction increase factor of formatting available to be applied to the given digital component, the current eligibility value, and the historical eligibility value data;

ranking the given digital component among other available digital components based on a comparison of the determined ranking score for the given digital component and ranking scores of the other available digital components;

determining, based on the ranking, that the given digital component rank is included the maximum number of highest ranked digital components;

selecting the given digital component for distribution in response to the component request based on the ranking score of the given digital component being included in the maximum number of highest ranked digital components; and transmitting the given digital component to the client device identified in the component request based on the selection of the given digital component for distribution, wherein determining the maximum interaction increase factor comprises:

evaluating, for each available formatting, an increase in user interactions provided by each available formatting;

identifying, based on the evaluating, the available formatting that provides a largest increase in user interactions relative to a level of user interactions attributed to the given digital component without any formatting applied; and determining the maximum interaction increase factor based on an interaction rate provided by the available formatting that provides a largest increase in user interactions.

8. The non-transitory computer readable medium of claim 7, wherein the instructions cause the one or more computing devices to perform operations further comprising:

determining a cumulative distribution function based on the historical eligibility value data; and determining a probability density function as a derivative of the cumulative distribution function.

9. The non-transitory computer readable medium of claim 7, wherein determining the maximum interaction increase factor based on an interaction rate provided by the available formatting that provides a largest increase in user interactions comprises determining a ratio between an interaction rate for the given digital component when formatted according to the available formatting that provides the highest interaction rate for the given digital component and the interaction rate for the given digital component when none of the available formatting is applied to the given digital component.

10. The non-transitory computer readable medium of claim 9, wherein determining the ranking score comprises determining a product of the maximum interaction increase factor and a value provided by the cumulative distribution function at a location corresponding to the current eligibility value of the given digital component.

11. The non-transitory computer readable medium of claim 9, wherein the instructions cause the one or more computing devices to perform operations further comprising formatting the given digital component according to the available formatting that provides the largest increase in user interactions.

12. The non-transitory computer readable medium of claim 11, wherein formatting the given digital component according to the available formatting that provides the largest increase in user interactions comprises dynamically modifying a visual appearance or code of the digital component prior to transmitting the digital component to the client device responsive to the component request.

13. A system comprising:
a data storage device storing machine executable instructions; and
one or more distributed computing devices that interact with the data storage device and execute the instructions, wherein execution of the instructions causes the one or more distributed computing devices to perform operations comprising:
- receiving, from a client device, a component request specifying a maximum number of digital components that are capable of being presented on a particular electronic document being rendered at the client device;
- obtaining a current eligibility value for a given digital component;
- obtaining historical eligibility value data for the given digital component;
- determining a maximum interaction increase factor for the given digital component based on a largest level of increase in user interactions provided by formatting available to be applied to the given digital component;
- determining a ranking score for the given digital component based on the maximum interaction increase factor of formatting available to be applied to the given digital component, the current eligibility value, and the historical eligibility value data;
- ranking the given digital component among other available digital components based on a comparison of the determined ranking score for the given digital component and ranking scores of the other available digital components;
- determining, based on the ranking, that the given digital component rank is included the maximum number of highest ranked digital components;
- selecting the given digital component for distribution in response to the component request based on the ranking score of the given digital component being included in the maximum number of highest ranked digital components; and
- transmitting the given digital component to the client device identified in the component request based on the selection of the given digital component for distribution, wherein determining the maximum interaction increase factor comprises:
  - evaluating, for each available formatting, an increase in user interactions provided by each available formatting;
  - identifying, based on the evaluating, the available formatting that provides a largest increase in user interactions relative to a level of user interactions attributed to the given digital component without any formatting applied; and
  - determining the maximum interaction increase factor based on an interaction rate provided by the available formatting that provides a largest increase in user interactions.

14. The system of claim 13, wherein the instructions cause the one or more computing devices to perform operations further comprising:
- determining a cumulative distribution function based on the historical eligibility value data; and
- determining a probability density function as a derivative of the cumulative distribution function.

15. The system of claim 13, wherein determining the maximum interaction increase factor based on an interaction rate provided by the available formatting that provides a largest increase in user interactions comprises determining a ratio between an interaction rate for the given digital component when formatted according to the available formatting that provides the highest interaction rate for the given digital component and the interaction rate for the given digital component when none of the available formatting is applied to the given digital component.

16. The system of claim 15, wherein determining the ranking score comprises determining a product of the maximum interaction increase factor and a value provided by the cumulative distribution function at a location corresponding to the current eligibility value of the given digital component.

17. The system of claim 15, wherein the instructions cause the one or more computing devices to perform operations further comprising formatting the given digital component according to the available formatting that provides the largest increase in user interactions.

* * * * *